(12) United States Patent
Wang et al.

(10) Patent No.: US 9,239,607 B2
(45) Date of Patent: Jan. 19, 2016

(54) STORING DATA USING A DIRECT DATA PATH ARCHITECTURE TO REDUCE ENERGY CONSUMPTION AND IMPROVE PERFORMANCE

(75) Inventors: Ren Wang, Portland, OR (US); Christian Maciocco, Portland, OR (US); Tsung-Yuan C. Tai, Portland, OR (US); Ahmad Samih, Beaverton, OR (US); Mona Vij, Portland, OR (US); Arun Raghunath, Beaverton, OR (US); John Keys, Beaverton, OR (US); Scott Hahn, Beaverton, OR (US); Raj Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1058 days.

(21) Appl. No.: 13/334,729

(22) Filed: Dec. 22, 2011

(65) Prior Publication Data

US 2012/0198030 A1    Aug. 2, 2012

(51) Int. Cl.
| | |
|---|---|
| *G06F 1/32* | (2006.01) |
| *H04L 29/08* | (2006.01) |
| *G06F 17/30* | (2006.01) |
| *G06F 3/06* | (2006.01) |
| *H04L 29/06* | (2006.01) |

(52) U.S. Cl.
CPC ............ *G06F 1/3234* (2013.01); *G06F 3/0625* (2013.01); *G06F 17/30147* (2013.01); *H04L 67/02* (2013.01); *H04L 67/06* (2013.01); *H04L 69/22* (2013.01)

(58) Field of Classification Search
CPC . H04L 67/06; G06F 1/3284; G06F 17/30147; G06F 1/3234; G06F 3/0625
See application file for complete search history.

(56) References Cited

U.S. PATENT DOCUMENTS

| | | | |
|---|---|---|---|
| 7,590,633 B1 | | 9/2009 | Manley et al. |
| 8,446,903 B1 | * | 5/2013 | Ranganathan et al. ....... 370/359 |
| 2002/0016869 A1 | | 2/2002 | Comeau et al. |
| 2005/0163117 A1 | | 7/2005 | Rhim et al. |
| 2005/0204078 A1 | | 9/2005 | Steinmetz et al. |
| 2008/0043732 A1 | | 2/2008 | Desai et al. |

(Continued)

FOREIGN PATENT DOCUMENTS

| | | |
|---|---|---|
| EP | 2 247 045 A1 | 3/2010 |
| WO | WO2011112787 A2 | 9/2011 |

OTHER PUBLICATIONS

Taiwanese Patent Office, Office Action and Search Report mailed Jan. 27, 2014 in Taiwanese application No. 101148742.

(Continued)

*Primary Examiner* — Aaron Strange
(74) *Attorney, Agent, or Firm* — Trop, Pruner & Hu, P.C.

(57) ABSTRACT

In one embodiment, the present invention includes a method for obtaining file information regarding a file to be downloaded from a remote location to a computing device, creating at least one empty file in a destination storage based on the file information and communicating block information regarding the empty file to a network interface, and receiving a data packet of the file in the network interface and directly sending a payload of the data packet from the network interface to the destination storage according to the block information, while a host processor of the computing device is in a low power state. Other embodiments are described and claimed.

16 Claims, 9 Drawing Sheets

(56) References Cited

U.S. PATENT DOCUMENTS

| | | |
|---|---|---|
| 2010/0205467 A1 | 8/2010 | Park |
| 2012/0072401 A1* | 3/2012 | Johri et al. .................... 707/705 |
| 2013/0054845 A1* | 2/2013 | Nimmala et al. ............... 710/36 |
| 2013/0083798 A1* | 4/2013 | Lakshmanamurthy et al. ............................. 370/392 |
| 2013/0259034 A1* | 10/2013 | Klein et al. ................... 370/389 |

OTHER PUBLICATIONS

International Searching Authority, "Notification of Transmittal of the International Search Report and the Written Opinion of the International Searching Authority," mailed Apr. 24, 2013, in International application No. PCT/US2012/070728.

* cited by examiner

STORING DATA USING A DIRECT DATA PATH ARCHITECTURE TO REDUCE ENERGY CONSUMPTION AND IMPROVE PERFORMANCE

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to bio-technology).

As more consumers adopt portable and mobile devices such as smartphones, tablet computers, mobile computers, portable media players and so forth, there is tremendous growth for network-based content and services. Examples include movie downloads, quick synchronizations, e.g., portable media player music/movie synchronization, cloud-based storage, etc. These usage models are fueled by ubiquitous and faster connectivity as well as increased compute capabilities of mobile devices such as smartphones, tablets and ultrabooks.

One drawback in provision of these services on mobile devices is the power consumption that connectivity and communication of large amounts of media content can consume. The typical datapath for the above-mentioned services and many others is as follows: incoming data to a device is received in a source component of the device, e.g., a network interface controller (NIC), and transferred to a sink component of the device, e.g., a storage device. This datapath involves a host central processing unit (CPU) to handle the data movement from one component of the device to the other component through a system memory. According to typical device architectures and data-paths, the host CPU and system memory are heavily involved in the data control and movement from an input device to an output device, which includes handling multiple copies of the data between source component and system memory, or even between kernel space and user space. This overhead incurs high power consumption and lowers performance.

DETAILED DESCRIPTION

Figure 1:
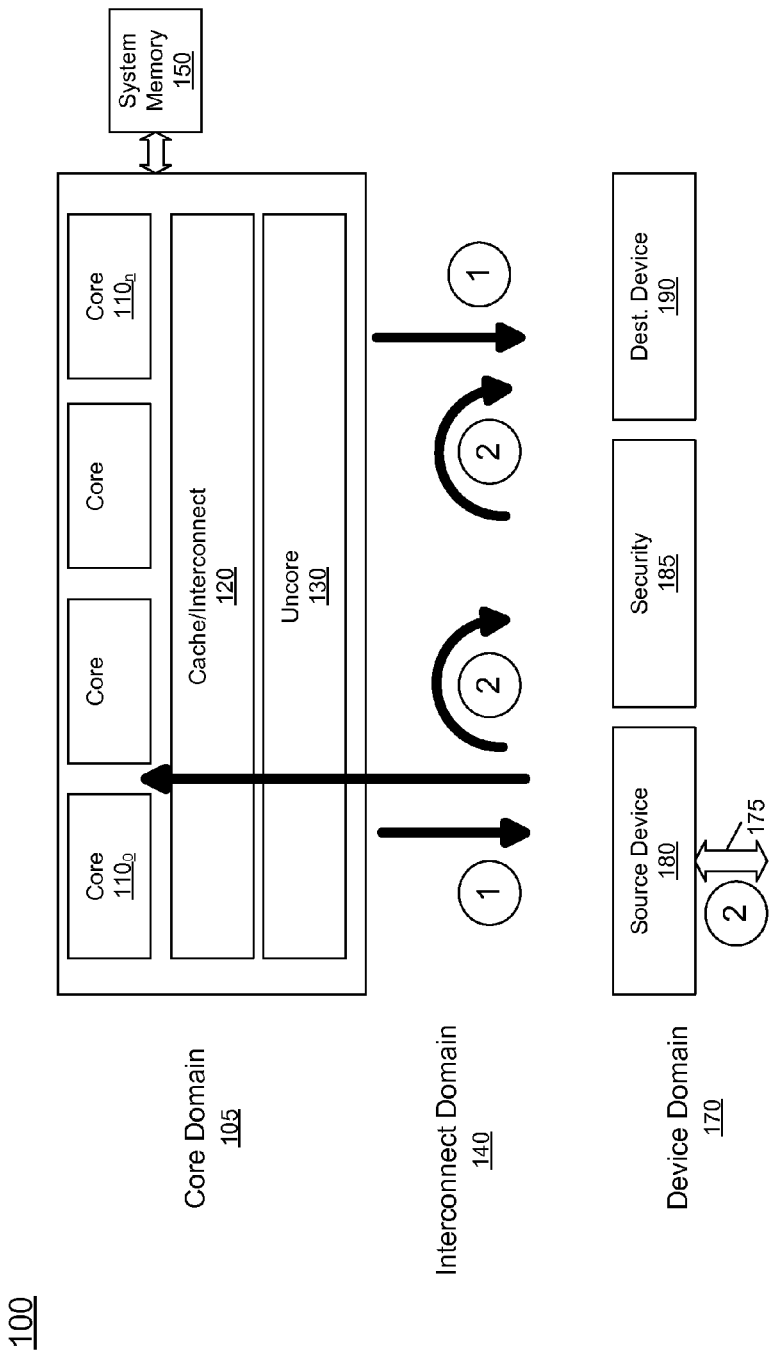
FIG. 1 is a block diagram of a system in accordance with one embodiment of the present invention.

Embodiments may provide a so-called "DirectPath" architecture which can enable a fast and energy efficient data transfer path where data is communicated directly from a source intellectual property (IP) block to a sink IP block without involving the CPU for data processing. Although the scope of the present invention is not limited in this regard, embodiments may be applicable to a system on a chip (SoC) that includes multiple independent IP agents or blocks on a single semiconductor die or multiple die of an integrated circuit package, or multiple discrete components connected through a bus and which may form the backbone of a processing system for a mobile device. As used herein, the term, "IP block," "IP logic," or "IP agent" is used to refer to varying types of hardware including general purpose processors, fixed function units, graphics units, media processors, network units, storage units and so forth.

Examples of the data transfer path can vary depending on a usage model, but can include network-to-storage, storage-to-network, capture device (such as an audio or video device)-to-encoder-to-network, or audio or video play-out, among others.

In various embodiments, a data transfer architecture may provide a control path to be handled by a host processor such as a single or multicore processor in accordance with an Intel Architecture (IA) instruction set architecture (ISA) and a host operating system (OS) to setup the hardware datapath. Then data is transferred from a source IP agent to a destination IP agent directly inside a SoC, without requiring CPU involvement for the transfer. Note that in some embodiments, the CPU can be part of the SoC or can be attached upstream of the SoC. Similarly, the destination IP agent can be directly inside the SoC or a discrete device coupled to the SoC. By doing so, this DirectPath architecture may significantly improve performance and reduce platform/CPU power.

This is accomplished by establishing a direct communication path between the source and destination devices, bypassing the CPU for long-lived data movement that does not require CPU processing, while keeping the CPU involved for the control aspect of the network protocol stack processing, e.g., transmission control protocol/Internet protocol (TCP/IP) control. In various embodiments, this direct datapath can be implemented without any change to network stack ecosystems as the stack still processes the network protocol without changes. Accordingly, there is also no change to a source side for the incoming communications such as received from a content server.

In some embodiments, this direct memory access (DMA) between source IP agent and target IP agent may leverage an ability of a connecting fabric to support direct "pairing" of IP blocks so the data can be directly DMA'ed from the source to the destination IP block.

It is worth noting that although architectures may directly communicate between source IP and destination IP blocks, some embodiments may also allow the data to go through multiple hops as well to reach its final destination. For example, the communication may be intermediated through an intermediate IP block such as a security IP block to perform security tasks on the data. Embodiments may realize throughput improvement and significant energy savings via a DirectPath architecture in accordance with an embodiment of the present invention.

With a DirectPath architecture and methods in accordance with an embodiment of the present invention, the data payload does not have to go through multiple DMA transactions through system memory and memory copies that involve the host CPU. The architecture allows the source IP block to directly send data to a destination IP block without CPU involvement for the data movement between these source and sink blocks, thus allowing the CPU and associated uncore components to stay in a low power state, along with other system components such as a system memory that otherwise would receive the data along its route to the eventual destination. For the specific network-to-storage usage model during the initial data transfer setup phase, pre-allocated file space can be created and communicated to the source logic. In turn, the data portion of the payload will be directly DMA'ed into the destination storage, reducing overhead significantly. Packet control headers, meanwhile, are still sent to the host for processing to avoid full TCP offloading to the source IP agent.

When embodiments are implemented in an SoC, network throughput performance may be improved while saving CPU cycles for more value added data processing. Embodiments may be particularly suitable for systems including a lower performance CPU, as the CPU can be used for other processing, enabling higher throughput and lower energy consumption Improved network throughput enables use of faster storage devices, enabling higher-speed solid state drive (SSD) devices.

For a typical client application that performs downloading, a combination of read and writes occur to receive a file over a socket and write the file out to disk. Instead in various embodiments, a client application can be DirectPath-aware such that it enables set up of a control path and then enables the direct data transfer. The modified client application still performs the same functionality as the file transfer protocol (FTP) client and no server side changes are incurred.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may also be used in other devices, such as handheld devices, SoCs, and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a system in accordance with an embodiment of the present invention. Specifically, FIG. 1 shows a system 100 which in the described implementation is an SoC that can be used to perform direct path data transfers. As seen in FIG. 1 SoC 100 includes various domains including a core domain 105, an interconnect domain 140, and a device domain 170. In the embodiment of FIG. 1, all of these domains can be of a single integrated circuit, although the scope of the present invention is not limited in this regard. For example, other implementations may include core domain 105, interconnect domain 140 and portions of device domain 170 as a single die SoC.

As shown in FIG. 1, core domain 105 includes a plurality of cores $110_0$-$110_n$. These cores can include various components including a front end unit to fetch and decode instructions, one or more execution units to execute instructions, and a back end unit to retire instructions. In various embodiments, the cores can all be homogeneous cores, or one or more of the cores can be of a heterogeneous design. For example, some of the cores may be relatively simple in-order cores, while others of the cores can be out-of-order cores. In addition each of the cores can include at least portions of a cache hierarchy, such as one of more levels of a private cache. In turn, the cores can be coupled to each other and to an uncore circuit 130 via a cache/interconnect 120. In various embodiments, uncore circuitry 130 can include generic processing circuitry such as power control circuitry, interface circuitry, memory controller circuitry and so forth. In addition, uncore circuitry 130 can include a shared cache such as a last level cache.

As further seen in FIG. 1, communication between core domain 105 and device domain 170 can be via an interconnect domain 140. In various embodiments, interconnect domain 140 can be a fabric including various interconnections, routers and so forth. As will be described further below, embodiments can be used with a Peripheral Component Interconnect (PCI) Express™ fabric in accordance with the PCI Express™ Base Specification version 3.0 (published 2010), an integrated on chip system fabric (IOSF) that provides interconnection and communication, e.g., via a primary channel and a sideband channel, which can be used to communicate out-of-band information efficiently, or another such fabric.

As further seen in FIG. 1 device domain 170 can include a source device 180 which in one embodiment can be a network interface controller (NIC) configured to receive information via an off-chip interconnect 175, e.g., an Ethernet connection. In the embodiment shown in FIG. 1, a direct path communication of payload data can be from source device 180 to a destination device 190, which can be a given type of a storage device, from an on-chip storage such as a static random access memory (SRAM) to an off-chip device such as a disk drive. In the embodiment shown, this direct path data transfer can be sent via an intermediary, namely a security device 185, which can perform security operations such as in accordance with a given digital rights management (DRM) technique such as Digital Living Network Alliance (DLNA) and digital transmission content protection-Internet protocol (DTCP-IP) protocol.

Using this embodiment, for much of the data transfer operations, the core domain 105 can be powered off, as it is not involved in the primary data transfer operations. Instead, after an initial device control/setup process in which source device 180 communicates with core domain 105 to set up a data path and to provide certain control information to both the cores as well as to destination device 190, actual data transfers need not involve cores 110 or a system memory 150. Instead, direct memory access (DMA) data transfer may occur from source device 180 to destination device 190, with control handled by a host OS operating within core domain 105. Note that this control can be of relatively limited complexity and involvement such that the cores can instead perform other processing tasks or be placed into a low power state. Although shown with this particular implementation in the embodiment of FIG. 1, understand the scope of the present invention is not limited in this regard.

Figure 2:
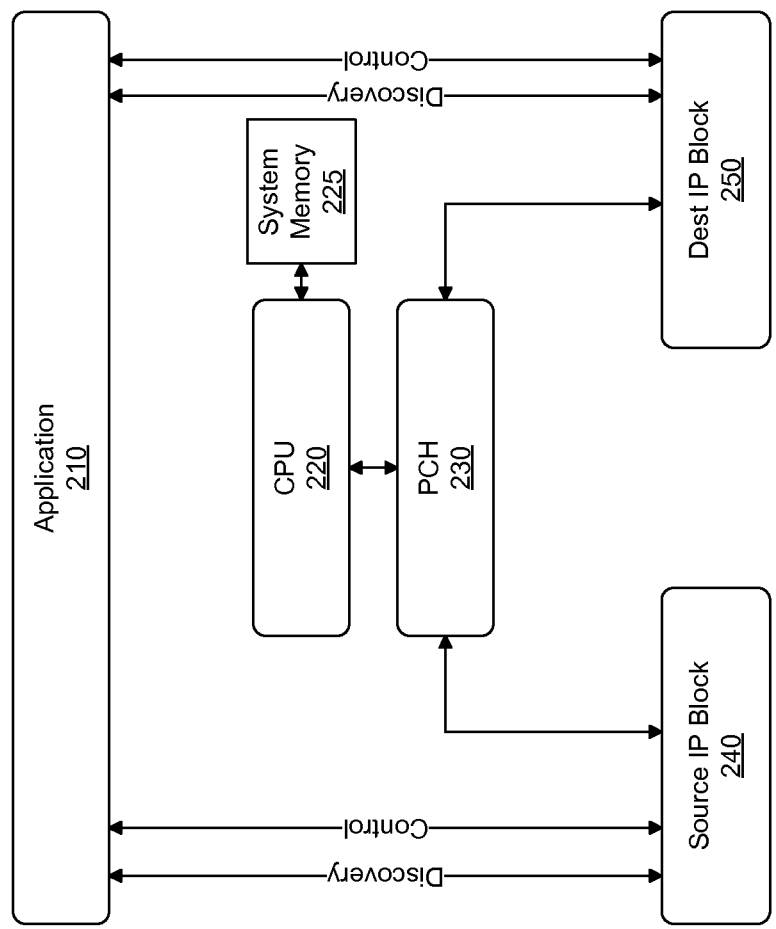
FIG. 2 is a high-level block diagram of an application view of a direct path architecture in accordance with an embodiment of the present invention.

Referring now to FIG. 2, shown in a high-level block diagram of an application view of a direct path architecture in accordance with an embodiment of the present invention. As shown in FIG. 2, architecture 200 may generally correspond to a given computing device such as a laptop computer, netbook, ultrabook, tablet computer, smartphone or other computing device such as a desktop computer or server computer. As seen, a CPU 220 can couple to a system memory 225 such as, but not limited to, a dynamic random access memory (DRAM). In addition, CPU 220 may be coupled to a peripheral controller hub (PCH) 230 which in turn can couple to a source IP block 240 (which in one embodiment can be a NIC) and a destination IP block 250 which can be a given type of storage including a disk drive, solid-state drive (SSD), optical storage, a magneto-resistive storage, a random access memory (RAM) disk (which may be a configured and sequestered portion of the system memory) or other storage.

As seen, application 210 may execute on the system and can be a given client application such as a media application that obtains digital content from a remote source. For example, the client application can be an audio player, video player or so forth that can further be configured to obtain and store content available from a remote source such as a content server of a content provider, e.g. a music provider, a video provider, a such as a multichannel video programming distributor (MVPD) or so forth and to store information in local storage 250. As seen, the system can be optimized for direct data communications between IP blocks 240 and 250. More specifically, this communication can be responsive to set up and control performed by CPU 220 via application 210.

Accordingly, after an initial discovery and control between the application 210 and the IP block, when payload data for this application is received by source IP block 240, it can be directly communicated to destination IP block 250, either via PCH 230 or a direct interconnect between the IP blocks. As seen, there is no need for a transit path through CPU 220 or system memory 225. Note that this payload is received with control information for which a host stack, e.g., of a given host OS, is used for network control processing. In this way, implementations can leverage an existing ecosystem such that there are no changes for the originator of the data communications (e.g., a content provider) and furthermore there are no changes to a network stack within system 200. Although shown at this high level in the embodiment of FIG. 2, understand the scope of the present invention is not limited in this regard.

Figure 3:
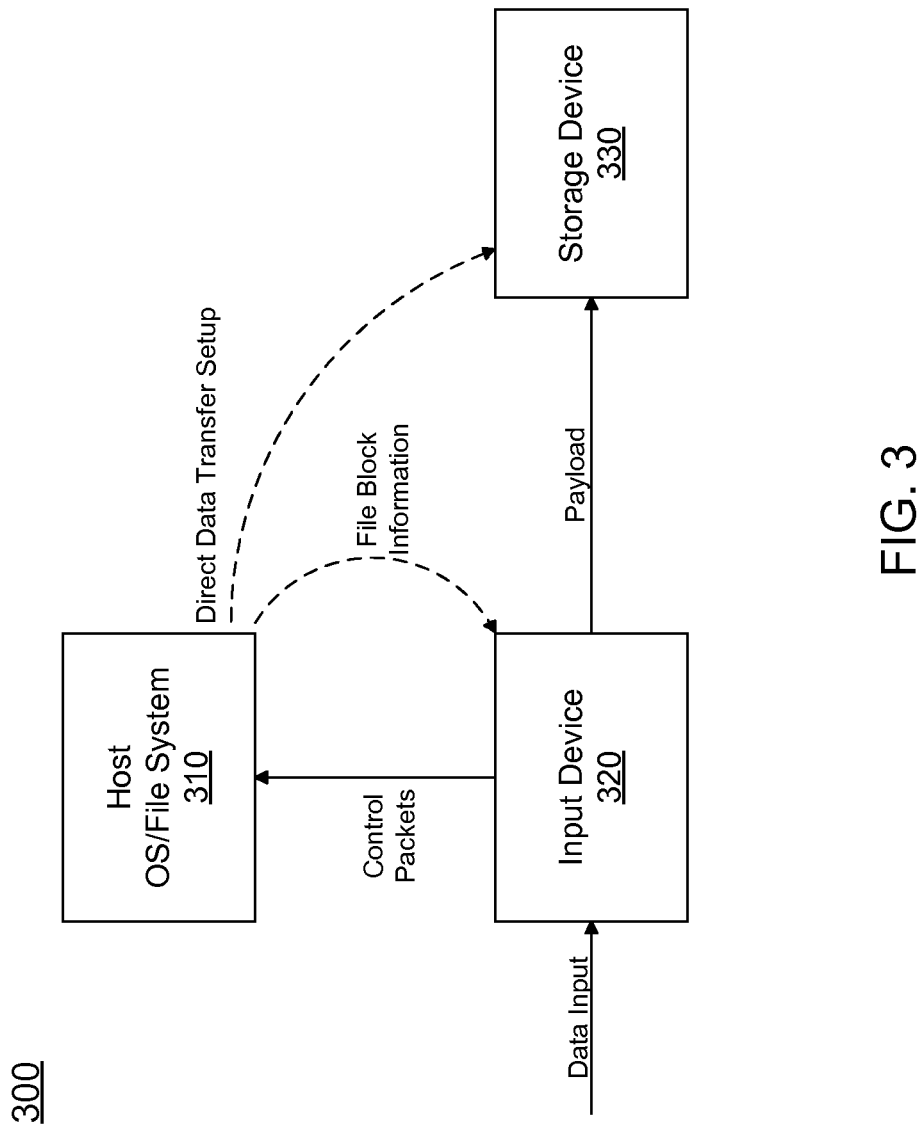
FIG. 3 is a high-level architecture illustration of a network-to-storage direct data transfer in accordance with an embodiment of the present invention.

Referring now to FIG. 3, shown is a high-level architecture illustration of a network-to-storage direct data transfer in accordance with an embodiment of the present invention. As shown in FIG. 3, architecture 300 includes an input device 320 which in an embodiment can be a NIC that is coupled to a storage device 330. In various embodiments, storage device 330 can be a disk drive, SSD, RAMdisk or so forth.

To set up the direct data transfer, interaction with a host OS/file system 310 may first occur. As seen, control packets can be communicated from input device 320 as received as part of a data input. From this information, the OS/file system can communicate file block information to input device 320 and further can communicate direct data transfer setup information to storage device 330. Thus in this way from the data input, control packets can be communicated to OS/file system 310 and then payload data can be communicated directly to storage device 330.

Figure 4:
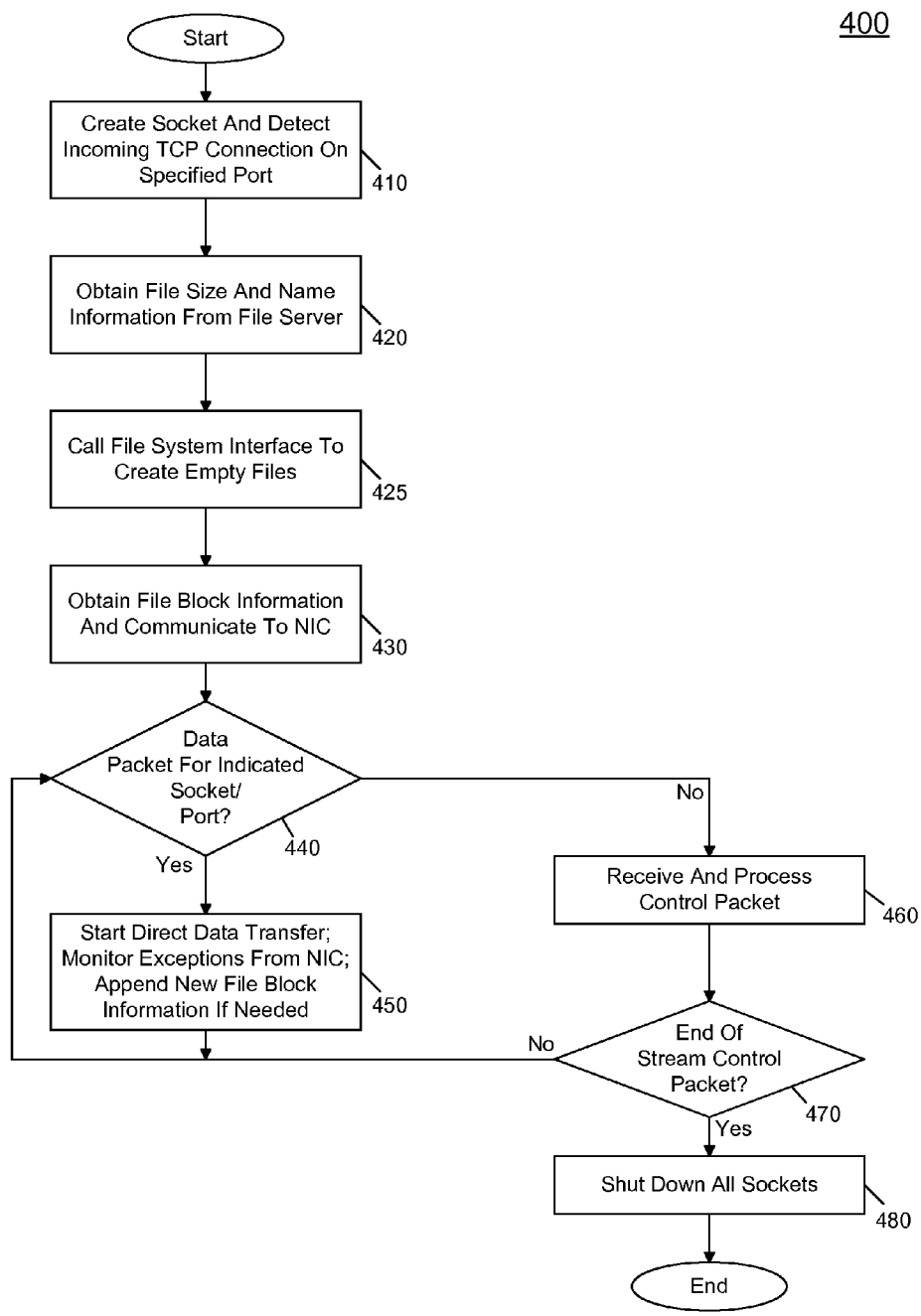
FIG. 4 is a flow diagram of a method of setting up and performing a direct data transfer operation in accordance with an embodiment of the present invention.

Referring now to FIG. 4, shown is a flow diagram of a method of setting up and performing a direct data transfer operation in accordance with an embodiment of the present invention. As shown in FIG. 4, method 400 can begin by creating a socket and detecting an incoming transport control protocol (TCP) connection on a specified port (block 410). Next, a file size can be obtained and name information can also be obtained from a file server (if this information is available) at block 420. In one embodiment, the setup file size and name information may correspond to a given piece of content desired to be downloaded. For example, the information can correspond to a music file such as a song or a video file, e.g., a movie or television program, and can include the title of the content, its expected file size, among other such data. In some embodiments, quality of service (QoS) information can be included and used to treat a given flow differently.

Still referring to FIG. 4, next at block 425 a call can be made to a file system interface to create one or more empty files. These empty files may thus correspond to an allocated amount of storage space for the requested file, e.g., based on the file size obtained. Control next passes to block 430 where file block information can be obtained and communicated to the NIC. Although the scope of the present invention is not limited in this regard, in some embodiments this information can include physical addresses of various file blocks when the target storage is a RAM disk. In this way, the NIC can DMA incoming payload data into this location. In an embodiment in which the target device is a SSD, this information can include storage information such as block number, stream identifier and so forth so that the SSD can optimize further the blocks if desired. In one embodiment, this information can be communicated via input/output (I/O) control calls. Accordingly at this point the source and sink devices are set up to handle a direct path communication.

After the data transfer is set up, when a NIC receives data packets, it may perform a comparison between metadata of the incoming packet and metadata associated with the client application. In one embodiment, the NIC may perform a comparison between a 5-tuple value ((including, in this embodiment, protocol, source-address, source-port, destination-address, and destination-port) to determine whether the packet belongs to the DirectPath flow. If it does, the NIC may separate the payload from a control header of the packet. The payload may then be directly sent to the storage and the control header sent to the host for processing. Since the file space is pre-allocated, the payload data realized in the NIC can be directly DMAed into the storage space, without being communicated to the system memory via a memory bus, which may significantly reduce the data movement overhead.

Accordingly, with further reference to FIG. 4 it can be determined at diamond 440 if a data packet is received for the indicated socket/port. If so, a direct data transfer can begin (block 450). As seen, during this transfer, the host OS (e.g., via the host processor) can monitor for exceptions from the NIC. For example, exceptions can correspond to a request for additional storage space if the received data payload is larger than the allocated space. Then responsive to this exception, new file block information can be appended if needed, as determined by the OS network protocol stack.

If instead a data packet for this DirectPath flow is not received, control passes to block 460 where a control packet can be received and processed, e.g., for a flow that does not follow the DirectPath route. Next it can be determined whether an end of stream control packet is received (diamond 470). If not, control passes to diamond 440 discussed above. And if an end of stream control packet is received, control passes to block 480 where all sockets can be shut down. Although shown at this high level in the embodiment of FIG. 4, understand the scope of the present invention is not limited in this regard.

Figure 5:
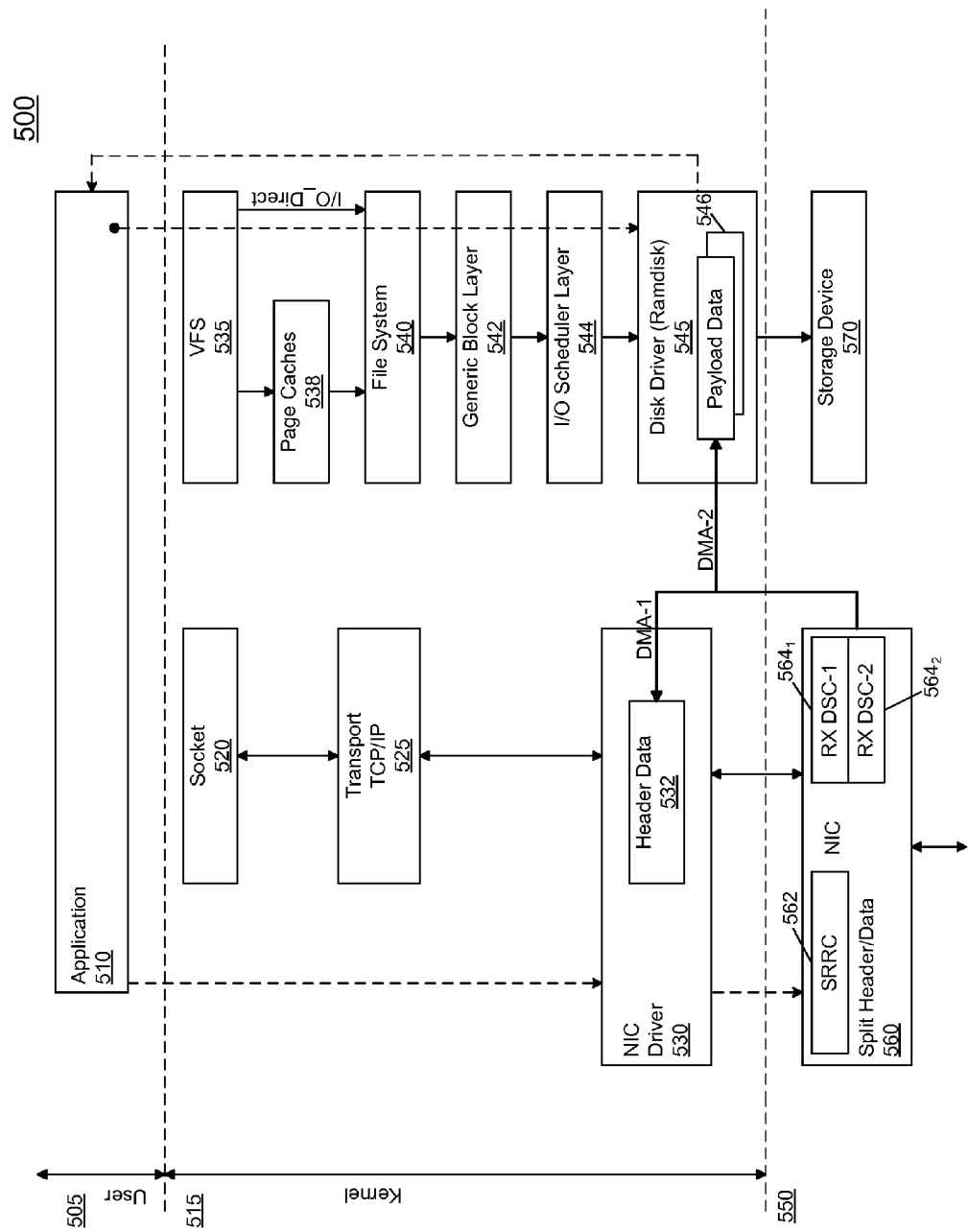
FIG. 5 is a block diagram of an architecture arrangement in accordance with an embodiment of the present invention.

Referring now to FIG. 5, shown are further details of an architecture arrangement in accordance with an embodiment of the present invention. As shown in FIG. 5, architecture 500 may provide for a software arrangement to handle direct data path operations which can be implemented to allow for direct communication of data between devices within a device layer 550, namely a NIC 560 and a storage device 570, which in the embodiment shown may be a RAMdisk. Although shown as a RAM disk storage, understand the scope of the present invention is not limited in this regard and other types of storage devices can be present.

As further seen in FIG. 5, a software architecture includes a user space 505 that can include an application 510 such as a content player/downloader/library application and a kernel space 515 which may include various components of an OS kernel.

To enable a direct data transfer between NIC 560 and storage device 570, set up and control operations can first occur. Specifically, application 510 can set up a receive buffer virtual address, which can be used to set up a buffer within a NIC driver 530, namely a buffer 532 which can store incoming header data associated with a data payload. NIC 560 has the ability to split control header and data portions of a packet, 562, based on, e.g., a tuple match (which may include IP source, destination, port source, destination or so forth). As further seen, NIC 560 can include data buffers $564_1$ and $564_2$ to store incoming data for control header and data payload communication paths. As further seen, the OS kernel can also include a network stack including a socket 520 and a transport TCP/IP 525 for handling the control communication path.

In addition to setting up this virtual buffer address, application 510 can further create an empty file and communicate this information towards storage device 570 to pre-arrange a predetermined amount of storage/space for a direct data transfer. Thus as seen, this information can be communicated through a virtual file system 535, via a page cache 538 and to a file system 540. In the embodiment shown in FIG. 5, file system 540 may be a given file system such as a Linux™ Ext2/Ext4 file system, which may provide system calls to create the empty file and gather all necessary file block information. The file space for the incoming data stream may be pre-allocated without incurring data disk run time I/O overhead, as the space is created beforehand so that when data arrives, there is no extra overhead. The corresponding information can be communicated through a generic block layer 542 and an I/O scheduler layer 544 and into a disk driver 545, which may be a driver for the RAMdisk. As seen, driver 545 may include buffers 546 that can receive DMA data transfers of payload data and communicate them directly to storage device 570. As further seen driver 545 can also notify the application of the file's blocks addresses within storage device 570. Although shown at this high level in the embodiment of FIG. 5, understand the scope of the present invention is not limited in this way.

Thus in the embodiment of FIG. 5, client application 510 calls a file system interface to obtain empty file information. Then application 510 may communicate the file's block information to a NIC interface through, e.g., an input/output control (IOCTL) call. Assume storage device 570 may be a RAM drive; application 510 may send the physical addresses of the block to NIC 560 through NIC driver 530, along with specific stream information that is to be subject to the DirectPath data transfer.

Figure 6:
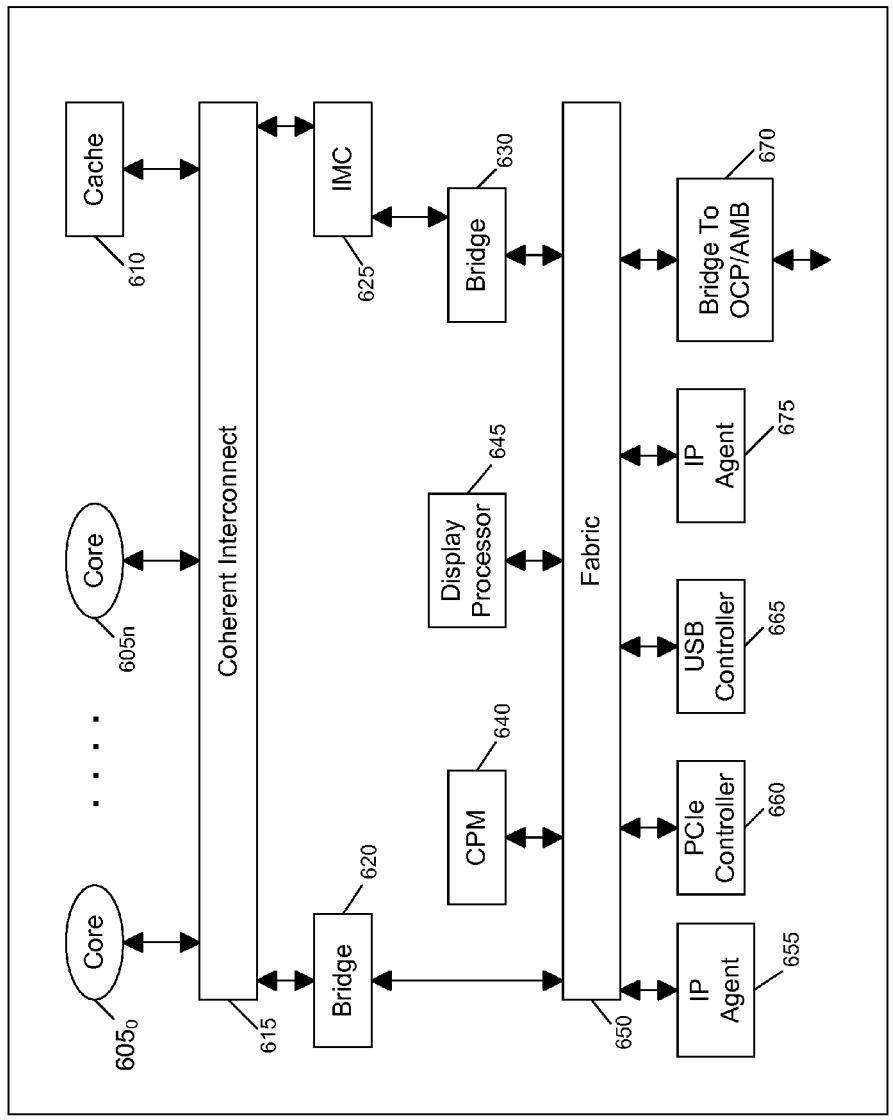
FIG. 6 is a high level block diagram of a SoC in accordance with an embodiment of the present invention.

As described above, an SoC can be implemented with a given type of interconnect structure. Referring now to FIG. 6, shown is a high level block diagram of a SoC in accordance with an embodiment of the present invention. As shown in FIG. 6, SoC 600 may include various components, all of which can be integrated on a single semiconductor die to provide for various processing capabilities at high speeds and low power, consuming a comparatively small amount of real estate. As seen in FIG. 6, SoC 600 includes a plurality of cores $605_0$-$605_n$. In various embodiments, cores 605 can be relatively simple in-order cores or more complex out-of-order cores. Or a combination of in-order and out-of-order cores can be present in a single SoC. As seen, cores 605 can be interconnected via a coherent interconnect 615, which further couples to a cache memory 610, e.g., a shared last level cache (LLC). Although the scope of the present invention is not limited in this regard, in one embodiment coherent interconnect 615 may be in accordance with the Quick Path Interconnect (QPI)™ specification available from Intel Corporation, Santa Clara, Calif.

As further seen in FIG. 6, coherent interconnect 615 may communicate via a bridge 620 to a fabric 650, which may be an IOSF fabric that includes processing and sideband communication channels. Coherent interconnect 615 may further communicate via an integrated memory controller 615 to an off-chip memory (not shown for ease of illustration the embodiment of FIG. 6), and further through bridge 630 to fabric 650.

As further seen in FIG. 6, various components can couple to fabric 650 including a content processing module (CPM) 640 which can be used for performing various operations such as security processing, cryptographic functions and so forth. In addition, a display processor 645 can be part of a media processing pipeline that renders video for an associated display.

As further seen, fabric 650 may further couple to an IP agent 655, which can be a source agent such as a NIC, and an IP agent 675, which may be a destination agent, e.g., an on-chip storage. Accordingly, a direct data path communication of payload data of a downloaded file received in agent 655 can occur between agent 665 and agent 675, with particular security processing performed by CPM 640. In addition, to enable communication with other on-chip devices, fabric 650 may further communicate with a PCIe™ controller 660 and a universal serial bus (USB) controller 665, both of which can communicate with various devices according to these protocols. Finally, shown in the embodiment of FIG. 6 is a bridge 670, which can be used to communicate with additional components of other protocols, such as an open core protocol (OCP) or an ARM advanced microcontroller bus architecture (AMBA) protocol. Although shown with these particular components in the embodiment of FIG. 6, understand that the scope of the present invention is not limited in this way and in different embodiments additional or different components may be present.

Figure 7:
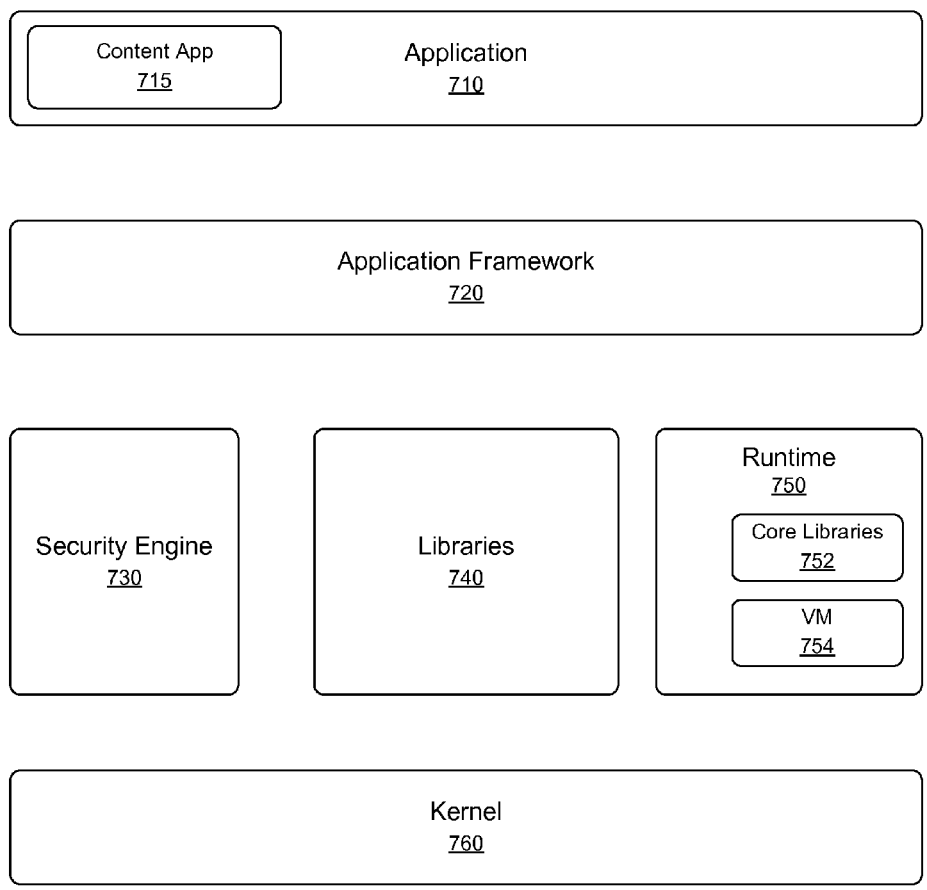
FIG. 7 is a block diagram of a software architecture for a mobile platform in accordance with one embodiment of the present invention.

Embodiments can be implemented in many different systems. For purposes of illustration, a smartphone, namely an Android™-based smartphone is shown in FIG. 7. As seen, FIG. 7 shows a block diagram of a software architecture 700 for an Android™-based platform. As seen, architecture 700 includes an application layer 710 in which various user applications can execute. One such application may be a content application 715 which may be configured in accordance with an embodiment of the present invention to enable a user to access and download remote content to the smartphone. Application 715 can be downloaded to the smartphone, e.g., via an application store provided by a service provider. Various other user applications, ranging from communications applications, computing applications, e-mail applications and so forth, may further reside in application layer 710.

An application framework 720 executes below application layer 710. Application framework 720 may include various managers to manage functionality of the smartphone. In turn, various services, agents, native libraries and a runtime can execute below application framework 720. In the embodiment shown in FIG. 7, such components may include a security engine 730 which can execute security operations on incoming data. Security engine 730 may further be configured with one or more DRM technologies to allow direct path communication of the content from a source agent to a non-volatile storage of the smartphone. In addition, various native libraries 740 may be present to handle different services. In addition, a runtime 750 can include core libraries 752 and a process virtual machine (VM) 754 such as a Dalvik VM. As further seen in FIG. 7, all of the above components can execute on a kernel 760, namely a Linux™ kernel. Such kernel can include various drivers for hardware interaction, networking interaction and so forth.

Figure 8:
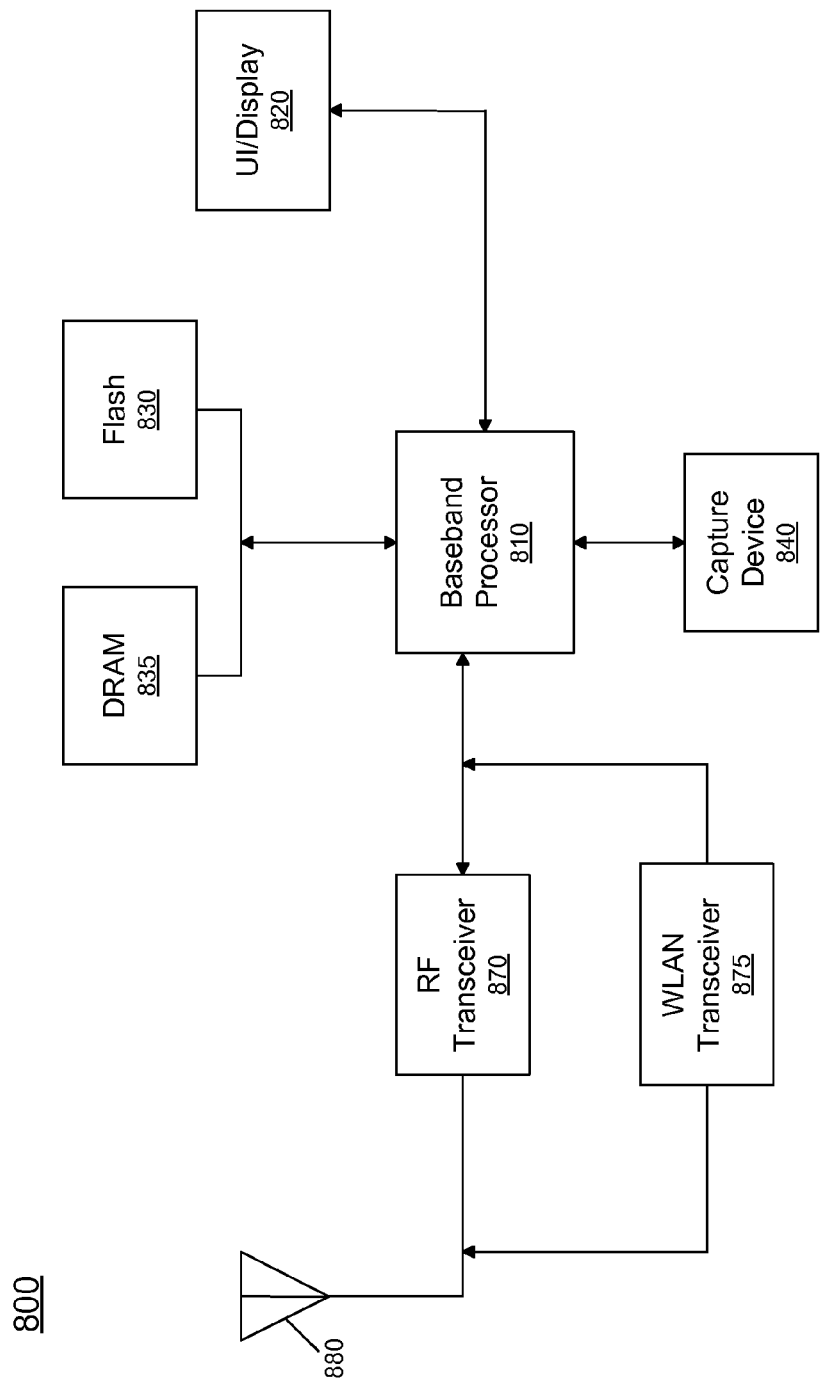
FIG. 8 is a block diagram of an example system with which embodiments can be used.

Embodiments thus can be used in many different environments. Referring now to FIG. 8, shown is a block diagram of an example system 800 with which embodiments can be used. As seen, system 800 may be a smartphone or other wireless communicator. As shown in the block diagram of FIG. 8, system 800 may include a baseband processor 810 on which a remote content sharing application can execute. In general, baseband processor 810 can perform various signal processing with regard to communications, as well as perform computing operations for the device. In turn, baseband processor 810 can couple to a user interface/display 820 which can be realized, in some embodiments by a touch screen display. In addition, baseband processor 810 may couple to a memory system including, in the embodiment of FIG. 8 a non-volatile memory, namely a flash memory 830 and a system memory, namely a dynamic random access memory (DRAM) 835. As further seen, baseband processor 810 can further couple to a capture device 840 such as an image capture device that can record video and/or still images.

To enable communications to be transmitted and received, various circuitry may be coupled between baseband processor 810 and an antenna 880. Specifically, a radio frequency (RF) transceiver 870 and a wireless local area network (WLAN) transceiver 875 may be present. In general, RF transceiver 870 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. Other wireless communications such as receipt or transmission of radio signals, e.g., AM/FM, or global positioning satellite (GPS) signals may also be provided. In addition, via WLAN transceiver 875, local wireless signals, such as according to a Bluetooth™ standard or an IEEE 802.11 standard such as IEEE 802.11a/b/g/n can also be realized. Although shown at this high level in the embodiment of FIG. 8, understand the scope of the present invention is not limited in this regard.

Figure 9:
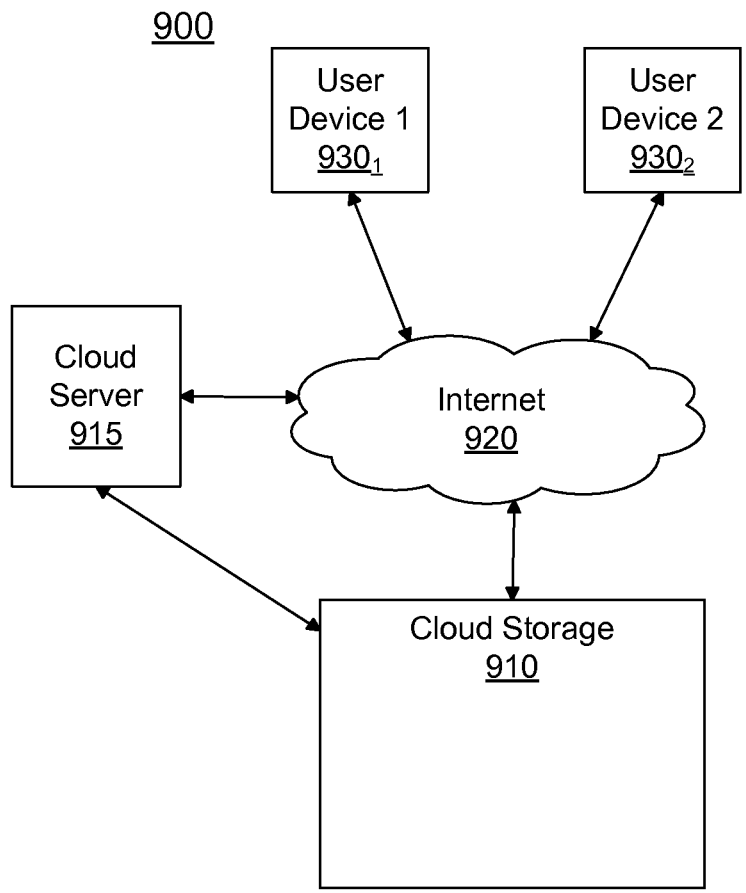
FIG. 9 is a block diagram of a network in accordance with an embodiment of the present invention.

Referring now to FIG. 9, shown is a block diagram of a network in accordance with an embodiment of the present invention. As shown in FIG. 9, network 900 may be used to allow users to access content via a network on a variety of different types of devices. As seen, network 900 may correspond to any type of communications network and may include many different types of computing devices interconnected via a given network such as Internet 920.

To enable cloud-based storage of, e.g., media content, a cloud storage 910 can be provided. This cloud storage may be part of a data center that includes various computing devices, storage devices and so forth. As one example, cloud storage 910 may be a storage device that includes multiple storage components such as disk, optical, or semiconductor-based storage. Cloud storage 910 may act as a repository of content associated with a given content provider, such as an MP3 or other music repository, a video repository such as a subscription-based video on demand service, or so forth.

As further seen in FIG. 9, at the same location, e.g., as part of the same data center, a cloud server 915 may be coupled to cloud storage 910. In various embodiments, cloud server 915 may be used to enable a user to request and obtain remote access to the content stored on cloud storage 810. As shown in FIG. 9, various user devices may be present, e.g., user devices 930$_1$ and 930$_2$. Such user devices may be personal devices of a given user such as a smartphone, tablet computer, laptop computer, netbook, ultrabook, desktop computer or so forth that can implement a DirectPath architecture in accordance with an embodiment of the present invention. Although shown at this high level in the embodiment of FIG. 9, understand the scope of the present invention is not limited in this regard.

Another aspect of the present invention is directed to at least one computer accessible medium that includes instructions that when executed cause a computing device to perform various operations to set up and initiate a direct data transfer between source and destination agents of the device. To this end, the instructions can cause the device to enable obtain file information regarding a file including requested content, communicate the file information to a host processor to set up a direct communication path between the source agent and the destination agent, and receive a data packet of the file in the source agent and directly send a payload of the data packet from the source agent to the destination agent according to information regarding the direct communication path. This receipt and payload transfer can occur while the host processor is in a low power state. The instructions can further cause the device to forward a control header of the data packet to the host processor. In one embodiment, a file system of the device can be used to create one or more empty files in a storage unit of the device (which may be the destination agent), and communicate information regarding this file to the source agent. Then, the source agent may provide the payload from the source agent to a security processor interposed between the source agent and the destination agent. In this way security processing may be performed on the direct data path between the source agent and the destination agent, while the host processor remains in a low power mode.

Embodiments may be implemented in code and may be stored on at least one non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer accessible medium comprising instructions that when executed cause a computing device to:
   obtain file information regarding a file to be downloaded from a remote location to a computing device;
   create at least one empty file in a destination storage of the computing device based on the file information and communicate block information regarding the at least one empty file to a network interface of the computing device; and
   receive a data packet of the file in the network interface and directly send a payload of the data packet from the network interface to a security processor of the computing device interposed between the network interface and the destination storage according to the block information, while a host processor of the computing device is in a low power state.

2. The at least one non-transitory computer accessible medium of claim 1, wherein the instructions further cause the computing device to forward a control header of the data packet to the host processor of the computing device.

3. The at least one non-transitory computer accessible medium of claim 1, wherein the instructions further cause the computing device to use a file system of the computing device to create the at least one empty file.

4. The at least one non-transitory computer accessible medium of claim 1, wherein the file comprises audio information, and the destination storage comprises a random access memory (RAM) disk of the computing device.

5. The at least one non-transitory computer accessible medium of claim 1, wherein the instructions further cause the computing device to directly send the payload from the network interface to the destination storage without intermediately storing the payload in a system memory of the computing device.

6. The at least one non-transitory computer accessible medium of claim 5, wherein the instructions further cause the computing device to maintain the system memory in a low power state while the file is downloaded to the computing device.

7. The at least one non-transitory computer accessible medium of claim 1, wherein the instructions further cause the computing device to power down a core domain of a system on a chip (SoC) of the computing device while directly sending the payload from the network interface to the destination storage.

8. The at least one non-transitory computer accessible medium of claim 7, wherein the instructions further cause the computing device to power a device domain and an interconnect domain of the SoC while directly sending the payload from the network interface to the destination storage, the device domain including the network interface.

9. The at least one non-transitory computer accessible medium of claim 8, wherein the instructions further cause the computing device to power the core domain of the SoC while the network interface receives at least some data packets of the file, and perform processing unrelated to the file in the core domain.

10. A system on a chip (SoC) comprising:
    a core domain including a plurality of cores to independently execute instructions;
    an interconnect domain to couple the core domain to a plurality of intellectual property (IP) logics of a device domain; and
    the device domain including a source IP logic, the source IP logic to couple to a network to receive a file requested by a user, the source IP logic to directly transfer payload data of data packets of the file to a destination IP logic via a security processor of the device domain, without communication of the payload data to the core domain and responsive to communication of direct data transfer setup information received from the core domain, while at least a portion of the core domain is in a low power state.

11. The SoC of claim 10, wherein the direct data transfer of payload is through the interconnect domain and bypasses the core domain.

12. The SoC of claim 10, wherein the source IP logic is to communicate control information of at least one of the data packets of the file to the core domain.

13. The SoC of claim 12, wherein the core domain is to cause an empty file to be created within the destination IP logic responsive to an application request.

14. The SoC of claim 13, wherein the core domain is to communicate file block information associated with the empty file and corresponding to the direct data transfer setup information to the source IP logic to enable the source IP logic to directly transfer the payload data of data packets of the file to the destination IP logic.

15. A system comprising:
    a processor to execute instructions;
    a wireless transceiver to transmit and receive instructions wirelessly;
    a source agent to couple to a network to receive a file requested by a client application executing on the processor, wherein the source agent is to communicate an exception associated with receipt of the file to the processor, and the processor is to handle the exception and provide additional block information to the source agent responsive to the exception when the exception corresponds to a request for additional storage space for the file;
    a destination agent coupled to the source agent to store the file; and
    at least one storage medium including instructions that enable the system to obtain file information regarding the file, communicate the file information to a file system of the system via the client application, create at least one file in the destination agent based on the file information via the file system and communicate block information regarding the at least one file to the source agent, and to thereafter receive a data packet of the file in the source agent, provide a control portion of the data packet to the processor to enable the processor to perform network protocol stack processing for the file, and provide a data portion of the data packet directly to the destination agent according to the block information via a bypass path that couples the source agent and the destination agent while bypassing the processor and a system memory while the processor is in a low power state.

16. The system of claim 15, wherein the source agent is to provide data portions of additional data packets of the file directly to the destination agent according to the additional block information via the bypass path.

* * * * *